US009528570B2

(12) United States Patent
Baltes et al.

(10) Patent No.: US 9,528,570 B2
(45) Date of Patent: Dec. 27, 2016

(54) ARTICLE, IN PARTICULAR DRIVE BELT, COMPRISING A TEXTILE COVERING

(71) Applicant: ContiTech Antriebssysteme GmbH, Hannover (DE)

(72) Inventors: Thomas Baltes, Hannover (DE); Jan Finzelberg, Hannover (DE); Henning Kanzow, Hannover (DE); Reinhard Teves, Seelze (DE); Reinhold Moses, Eimen (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 129 days.

(21) Appl. No.: 14/558,351

(22) Filed: Dec. 2, 2014

(65) Prior Publication Data
US 2015/0087456 A1  Mar. 26, 2015

Related U.S. Application Data

(63) Continuation of application No. PCT/EP2013/061522, filed on Jun. 5, 2013.

(30) Foreign Application Priority Data

Jun. 25, 2012 (DE) .......................... 10 2012 105 510

(51) Int. Cl.
F16G 5/08 (2006.01)
F16G 1/10 (2006.01)
(52) U.S. Cl.
CPC .. *F16G 5/08* (2013.01); *F16G 1/10* (2013.01)
(58) Field of Classification Search
CPC ..................................... F16G 1/10; F16G 5/08

USPC .......................................................... 474/266
See application file for complete search history.

(56) References Cited

U.S. PATENT DOCUMENTS

| 3,859,824 | A | * | 1/1975 | Krylov | ................... D04B 15/06 66/10 |
| 3,981,206 | A | | 9/1976 | Miranti, Jr. et al. | |
| 4,027,545 | A | | 6/1977 | White, Jr. | |
| 5,417,618 | A | | 5/1995 | Osako et al. | |
| 5,645,504 | A | | 7/1997 | Westhoff | |
| 5,954,606 | A | * | 9/1999 | Mishima | .................. F16G 1/10 26/51.4 |
| 6,572,505 | B1 | | 6/2003 | Knutson | |
| 6,715,325 | B2 | * | 4/2004 | Sangiacomo | ............ D04B 9/12 66/107 |

(Continued)

FOREIGN PATENT DOCUMENTS

DE    38 23 157 A1    2/1990
DE    10 2007 062 285 A1    6/2009

(Continued)

OTHER PUBLICATIONS

International Search Report dated Sep. 9, 2013 of international application PCT/EP2013/061522 on which this application is based.

*Primary Examiner* — William E Dondero
*Assistant Examiner* — Robert T Reese
(74) *Attorney, Agent, or Firm* — Walter Ottesen, P.A.

(57) ABSTRACT

An article comprises an elastic main body on the basis of at least one thermoplastic elastomer or on the basis of a vulcanizate, with an article surface that is provided with a textile covering, wherein the textile covering is a plated knit fabric. The article is, in particular, a drive belt, preferably a V-ribbed belt.

14 Claims, 1 Drawing Sheet

(56) References Cited

U.S. PATENT DOCUMENTS

| | | | |
|---|---|---|---|
| 6,776,014 B1* | 8/2004 | Laycock | D04B 1/18 442/306 |
| 6,863,761 B2 | 3/2005 | Knutson | |
| 7,669,442 B1* | 3/2010 | Zhu | A41D 19/01511 66/174 |
| 7,752,681 B2* | 7/2010 | Michel | A41B 9/00 2/409 |
| 7,842,628 B2* | 11/2010 | Yasui | A41B 17/00 442/181 |
| 8,176,569 B2* | 5/2012 | Rock | A41D 1/04 2/2.5 |
| 8,262,523 B2 | 9/2012 | Kanzow et al. | |
| 2003/0004025 A1* | 1/2003 | Okuno | F16G 1/10 474/260 |
| 2008/0032837 A1* | 2/2008 | Unruh | F16G 1/28 474/143 |
| 2008/0108466 A1 | 5/2008 | Pelton | |
| 2011/0129647 A1* | 6/2011 | Duke, Jr. | C08G 18/10 428/156 |
| 2011/0269588 A1* | 11/2011 | Fleck | F16G 1/10 474/205 |
| 2014/0364260 A1* | 12/2014 | Takahashi | C08J 5/04 474/263 |
| 2015/0111677 A1* | 4/2015 | Nishiyama | F16G 1/10 474/264 |
| 2015/0152590 A1* | 6/2015 | Knox | C08J 5/06 428/36.92 |

FOREIGN PATENT DOCUMENTS

| | | |
|---|---|---|
| DE | 10 2008 012 044 A1 | 9/2009 |
| EP | 0 069 589 A2 | 1/1983 |
| WO | 02/061186 A1 | 8/2002 |
| WO | 2005/080821 A1 | 9/2005 |
| WO | 2011/110372 A1 | 9/2011 |

* cited by examiner

ARTICLE, IN PARTICULAR DRIVE BELT, COMPRISING A TEXTILE COVERING

CROSS REFERENCE TO RELATED APPLICATIONS

This application is a continuation application of international patent application PCT/EP2013/061522, filed Jun. 5, 2013, designating the United States and claiming priority from German application 10 2012 105 510.6, filed Jun. 25, 2012, and the entire content of both applications is incorporated herein by reference.

FIELD OF THE INVENTION

The invention relates to an article having an elastic foundational body based on a thermoplastic elastomer or on a vulcanizate and having an article surface bearing a textile covering.

BACKGROUND OF THE INVENTION

An article exposed to dynamic stresses and thus also to wear as well as noise development is for example a band, a strap, a belt, a hose, an air spring lobe, a compensator or a multilayered web, of which the belt in the form of a drive belt is of particular importance. The foundational body of a drive belt comprises a top ply as belt spine and a substructure with a force transmission zone. The following patent literature in particular is referenced for this: DE 38 23 157 A1, U.S. Pat. No. 8,262,523, WO 2005/080821 A1, US 2008/0032837, U.S. Pat. No. 3,981,206 and U.S. Pat. No. 5,417,618. A drive belt has elasticity because the foundational body and thus the top ply and the substructure contains a polymeric material having elastic properties, for which in particular the two groups of materials that are known as elastomers and thermoplastic elastomers (TPEs) are suitable here. Elastomers based on a vulcanized mixture of rubber are of particular importance.

The elastic foundational body further usually incorporates an embedded strength or tensile member, which may have one or more plies.

Drive belts in particular have a coating in the region of the force transmission zone in particular for noise reduction as well as enhanced abrasion resistance. This coating may be, for example, a flocked covering as described in DE 38 23 157 A1, or else a film covering as described in DE 10 2008 012 044 for example. It is similarly possible to use nonwovens where a loose fibrous web is thermally consolidated for example.

Typically, however, textile coverings are used as coating. Particularly textile coverings in the form of a woven fabric formed by intercrossing two sets of threads, viz., warp and weft, have recently become established in the marketplace. These are described inter alia in WO 2011/1103272A1 or DE 10 2007 062 285 A1.

Textile coverings are similarly known to take the form of a knitted fabric where a loop formed by a thread intermeshes into another loop. The knitted stitches thus obtained may be formed using one or more threads.

U.S. Pat. No. 8,262,523, for example, uses a warp-knitted fabric consisting of a first yarn, in particular of a polyamide (PA) or polyester (PES), and of a second yarn, in particular of a polyurethane (PU). The disadvantage is that test engines give rise to noise in the presence of moisture. The reason is the increased friction due to vulcanizate penetration through the knitted stitches, which additionally has an adverse effect on wear resistance.

A knitted textile covering is similarly disclosed in U.S. Pat. No. 3,981,206, EP 0 069 589 or U.S. Pat. No. 4,027,545. The disadvantage with this is, again, that test engines give rise to noise in the presence of moisture. Nor are the combination threads described therein durably stable, so the entire textile covering will frequently become brittle.

Relatively open-meshed knits useful as textile covering for drive belts are known inter alia from U.S. Pat. No. 6,572,505, U.S. Pat. No. 6,863,761, US 2008/0108466A1, US 2011/0269588 or U.S. Pat. No. 5,645,504. Adherence of the textile covering to the surface of the belt is improved by the openness of the mesh because gum/vulcanizate is able to penetrate through the knitted stitches during vulcanization. The result of this is a so-called ribbed construction, for example a 1×1 rib construction in U.S. Pat. No. 5,645,504 or a 2×2 rib construction in US 2008/0108466A1. The disadvantage with this is that the ribs themselves and the resultant vulcanizate penetration cause friction to increase, which in turn leads to noise production and also to adverse impacts on belt life.

SUMMARY OF THE INVENTION

The present invention therefore has for its object to provide an article, in particular a drive belt, comprising a textile covering and combining good adherence to the article surface with simultaneously favorable noise behavior and optimized wear resistance/coefficient of friction.

This object is achieved when the textile covering is a plated knitted fabric.

Plated knitted fabric surprisingly provides control of the properties of the textile-covered article, in particular a drive belt, in the direction of the article inside surface and simultaneously also in the direction of the article outside surface. In the direction of the article inside surface, for example, it is thus possible to optimize the adherence to the vulcanizate, while at the same time optimized noise behavior coupled with good wear resistance can be achieved in the direction of the article outside surface.

In plated knitted fabric, the stitches are knitted from at least two threads such that one thread (known as the plating or else covering thread) comes to lie on the technical face of the fabric, while the second thread (the plated or covered thread) comes to lie on the technical back of the fabric. In addition, there may optionally be present at least one further additional thread to stabilize the knitted fabric during processing.

The knitted fabric may be constructed as a loop-drawingly knitted fabric or as a warp-knitted fabric, in which case it is a loop-drawingly knitted fabric which is advantageously used. In one version of the invention, the loop-drawingly knitted fabric is configured as a one-by-one rib knitted fabric, as a purl knitted fabric and, with particular preference, as a plain single jersey. This means in the case of a loop-drawingly knitted fabric that, in each case, one thread only extends on the technical face of the fabric while a further second thread only extends on the technical back of the fabric.

By way of an additional third thread there may be used, for example, a thin elastane yarn which only has minimal effect on the surface properties, since it is destroyed during vulcanization. It merely serves to stabilize the textile covering during processing.

The above-mentioned measures, then, make possible, for example, combining a wear-resistant surface of nylon-6,6 polyamide with the noise-absorbing properties and the good wet grip of a cotton yarn. The combination of nylon-6,6 and cotton is therefore particularly preferable.

Further possible combinations include:
The first thread is selected from the group containing natural fibers, such as cotton, sisal, hemp, linen, silk, and rayon and polyvinyl alcohol and polyimide. These display particularly good properties with regard to adherence, noise behavior and wet grip and are therefore preferentially used as thread for that side of the textile covering which faces the vulcanizate.

The second thread is selected from the group containing polyamides, such as nylon-6,6, nylon-12, nylon-6, and polyethylenes, such as UHMWPE, and polyethylene terephthalates and polyphenylene sulfides and aramids and polyether ketones and polybenzoxazoles and polypropylenes. These display particularly good properties with regard to wear resistance and coefficient of friction and are therefore preferentially used as thread for that side of the textile covering which is positioned on the article outside surface.

The recited materials may be used in any desired combinations, depending on the properties to be achieved. Similarly, the individual threads may be constructed as staple fibers or filament fibers, depending on whichever is the desired property.

The plated knitted fabric may have one or more plies. The top side and/or the bottom side of the article may be coated with the plated knitted fabric.

When the article is a drive belt, in particular a V ribbed belt, it is preferably the ribbed side which is coated with the plated knitted fabric. But it is also possible for the top ply to be additionally coated with the plated knitted fabric.

Depending on the thickness of the threads plated atop each other, it may be possible that, after the drive belt has been constructed, parts of the lower thread may also be visible at the surface, so both threads may influence the surface properties to a varying degree. This provides further scope for individually varying the belt properties.

Usage of cross-plated knitted fabric is similarly conceivable.

Any penetration of vulcanizate may be varied via the number of knitted courses. This is in some instances also done according to thread diameter. The number of courses is preferably between 15 and 35 and more preferably between 25 and 35. Departures from this up and down are conceivable here depending on thread diameter.

An adhesion promoter may additionally be provided to the knitted fabric on the side which faces the article side. The knitted fabric may also be impregnated with a polymer solution, in particular from the aspect of changing the CoF value. Using a polymer layer, in particular a polymer film, preferably a polymer layer or film based on polyethylene, is also advantageous here.

The adhesion promoter and/or the polymer solution may further comprise a dry lubricant—especially to reduce the coefficient of friction in the case of the polymer solution. The dry lubricant is preferably a fluoropolymer, for example polytetrafluoroethylene (PTFE) and/or polyvinyl fluoride (PVF) and/or polyvinylidene fluoride (PVDF), of which polytetra-fluoroethylene (PTFE) in particular is suitable.

The adhesion promoter and/or the polymer solution may further be rendered electrically conductive, in particular on the basis of carbon black and/or graphite and/or an added metal. The use of an electrically conductive carbon black is of particular importance here.

An additional coating may be provided on the external surface of the plated knitted fabric. Preferably, however, the plated knitted fabric is free from any additional coating.

The plated knitted fabric is used in particular in the production of a band, a strap, a belt, a hose, an air spring lobe (axial lobe, cross-laid lobe), a compensator or a multilayered web. The use is of particular importance in the production of a drive belt which may be constructed as a flat belt, as a V-belt, as a V-ribbed belt, as a toothed belt, as a clutch belt or as an elevator belt.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
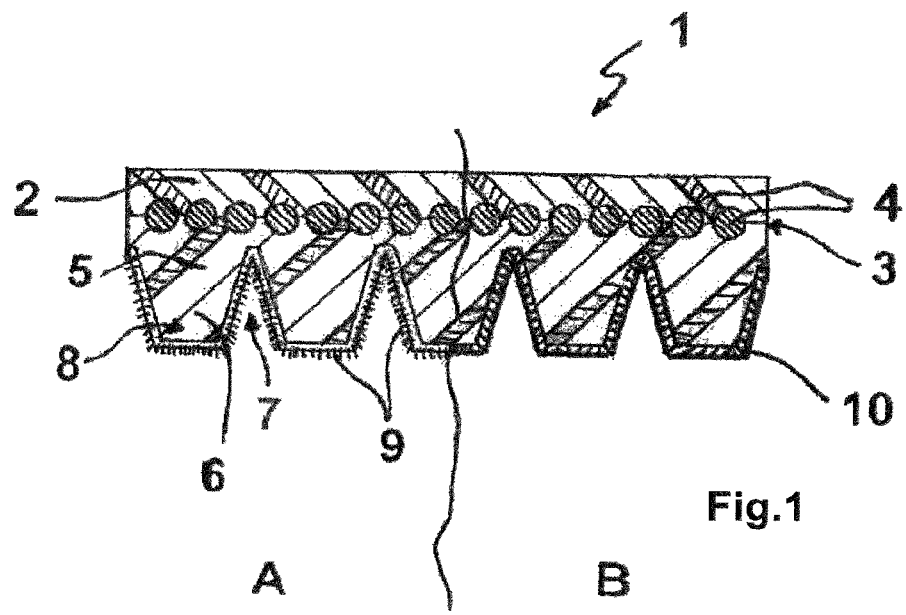
FIG. 1 shows a drive belt in the form of a V-ribbed belt.

FIG. 1 shows a drive belt 1 in the form of a V-ribbed belt having a top ply 2 as belt spine, a strength member ply 3 having a parallel arrangement of longitudinal tensile members 4 and also having a substructure 5. The substructure has a V-ribbed construction formed of ribs 6 and grooves 7. The substructure comprises the force transmission zone 8.

The top ply 2 and the substructure 5 taken together form the elastic foundational body based on a thermoplastic elastomer or on a vulcanizate, in particular in the form of a vulcanized mixture of rubber, containing at least one rubber component and mixture ingredients. The rubber component used is in particular an ethylene-propylene copolymer (EPM), an ethylene-propylene-diene monomer copolymer (EPDM), (partly) hydrogenated nitrile rubber (HNBR), chloroprene rubber (CR), fluoro rubber (FKM), natural rubber (NR), styrene-butadiene rubber (SBR) or butadiene rubber (BR), which are used uncut or cut with at least one further rubber component, in particular with one of the aforementioned types of rubber, for example in the form of an EPM/EPDM or SBR/BR blend. EPM or EPDM or an EPM/EPDM blend is of particular importance here. The mixture ingredients comprise at least one crosslinker or crosslinker system (crosslinking agent plus accelerator). Further mixture ingredients are usually a filler and/or a processing auxiliary and/or a plasticizer and/or an antioxidant and also optionally further added substances, for example fibers and color pigments. The general state of the rubber mixture arts is referenced here.

The tensile members 4 are more particularly single cords, for example of steel, polyamide, aramid, polyester, glass fibers, polyetheretherketone (PEEK) or polyethylene 2,6-naphthalate (PEN).

Where drive belt 1 is to represent the prior art, its force transmission zone 8 has a flocked covering 9 (portion A).

Where, by comparison, drive belt 1 is in accordance with the present invention, its force transmission zone 8 is covered (in portion B) with the plated knitted fabric 10 of the present invention, whereby the properties of the belt can be individually varied.

The top ply 2 of drive belt 1 may be uncoated. Frequently, a coating is also provided to this top ply. Usually, a coating according to the prior art will be sufficient here. The introductory part of the description is referenced in this respect.

However, top ply 2 may also be endowed with the plated knitted fabric, although this is not strictly necessary—in contradistinction to the force transmission zone 8.

Figure 2:
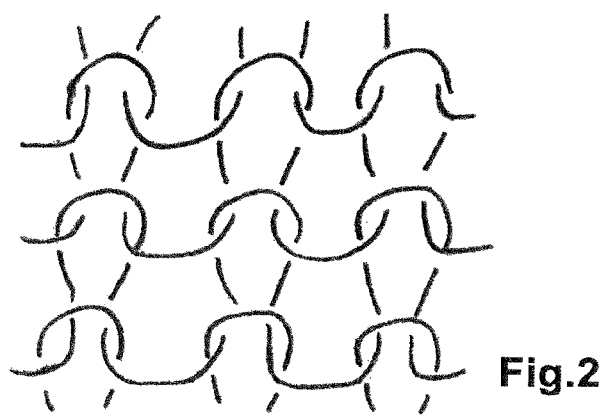
FIGS. 2 and 3 each show a plain single jersey fabric.
Figure 3:
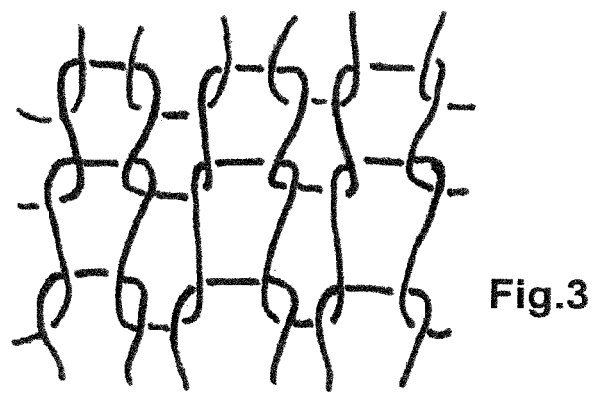

FIG. 2 and FIG. 3 each show a plain single jersey fabric. FIG. 2 shows the technical back of the jersey and FIG. 3 shows the technical face of the jersey.

It is understood that the foregoing description is that of the preferred embodiments of the invention and that various changes and modifications may be made thereto without departing from the spirit and scope of the invention as defined in the appended claims.

LIST OF REFERENCE SIGNS (Part of the Description)
1 drive belt (V-ribbed belt)
2 top ply (belt spine)
3 strength member ply
4 tensile members in the form of individual cords
5 substructure
6 ribs
7 grooves
8 force transmission zone
9 flocked covering (portion A)
10 plated knitted fabric (portion B)

What is claimed is:

1. An article comprising:
an elastic foundational body based on at least one thermoplastic elastomer or on a vulcanizate;
wherein the elastic foundational body has an article surface bearing a textile covering; and,
wherein the textile covering is a plated knitted fabric.

2. The article as claimed in claim 1, wherein the article is a band, a strap, a belt, a hose, an air spring lobe, a compensator or a multilayered web.

3. The article as claimed in claim 1, wherein the plated knitted fabric includes at least two different threads which differ from each other in their materials.

4. The article as claimed in claim 1, wherein the plated knitted fabric comprises at least cotton and polyamide.

5. The article as claimed in claim 4, wherein the polyamide is nylon-6,6.

6. The article as claimed in claim 1, wherein the plated knitted fabric is a loop-drawingly knitted fabric or a warp-knitted fabric.

7. The article as claimed in claim 6, wherein the loop-drawingly knitted fabric is a plain single jersey.

8. A drive belt comprising:
an elastic foundational body based on at least one thermoplastic elastomer or on a vulcanizate;
a top ply as belt spine;
a substructure with a force transmission zone; and,
a textile covering disposed on the top ply, the force transmission zone or on the top ply and the force transmission zone;
wherein the textile covering is a plated knitted fabric.

9. The drive belt as claimed in claim 8, wherein the drive belt is configured as a flat belt, as a V-belt, as a V-ribbed belt, as a toothed belt, as a clutch belt or as an elevator belt.

10. The drive belt as claimed in claim 8, wherein the plated knitted fabric includes at least two different threads which differ from each other in their materials.

11. The drive belt as claimed in claim 8, wherein the plated knitted fabric comprises at least cotton and polyamide.

12. The drive belt as claimed in claim 11, wherein the polyamide is nylon-6,6.

13. The drive belt as claimed in claim 8, wherein the plated knitted fabric is a loop-drawingly knitted fabric or a warp-knitted fabric.

14. The drive belt as claimed in claim 13, wherein the loop-drawingly knitted fabric is a plain single jersey.

* * * * *